April 16, 1968     D. WALKER     3,377,784
PORTABLE MANHOLE FILTER ASSEMBLY
Filed Aug. 11, 1966     2 Sheets-Sheet 1
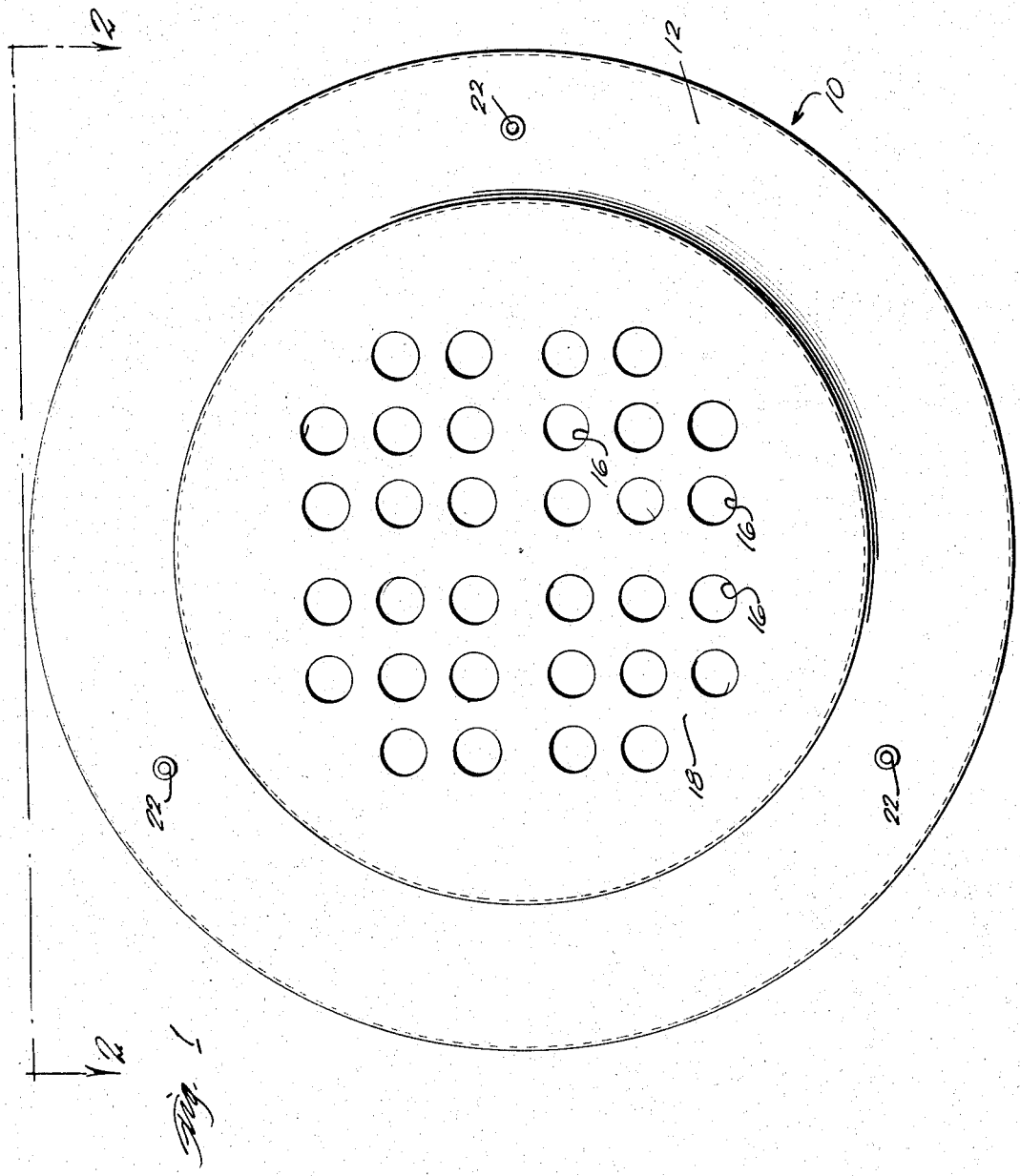
INVENTOR.
DARRELL WALKER
BY
Victor J. Evande
ATTORNEYS

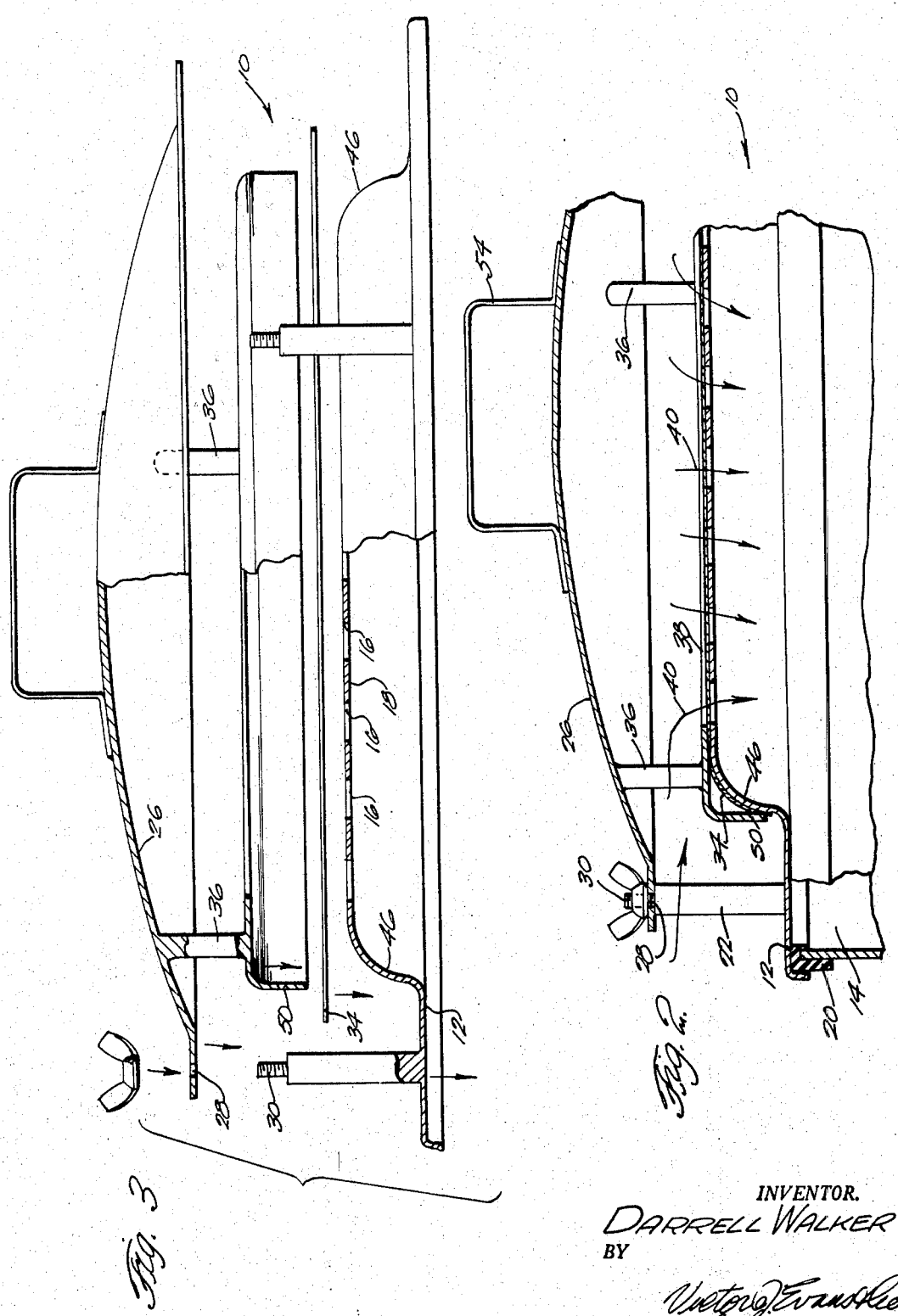

United States Patent Office 3,377,784
Patented Apr. 16, 1968

---

3,377,784
PORTABLE MANHOLE FILTER ASSEMBLY
Darrell Walker, New Lisbon, Wis. 53950
Filed Aug. 11, 1966, Ser. No. 571,797
3 Claims. (Cl. 55—385)

ABSTRACT OF THE DISCLOSURE

A portable manhole filter assembly for use in a transportation tank having a filter frame adapted to be mounted on a manhole opening in a tank and having a central portion perforated to provide air flow therethrough, a cover dome coextensive in peripheral dimensions with the filter frame and being held in place, a filter disk of paper covering the central portion of the filter frame, a filter disk hold-down means to engage the filter disk in place onto the filter frame and the central portion of the filter disk hold-down means being raised and having mating edges therewith.

---

The present invention relates to an improvement in filter assembly devices for use with milk transportation tanks and bulk pickup storage means of mobile in nature so that there is precluded the creation inside of the tank or storage means of a vacuum that would cause collapse to the tank, and more particularly the invention relates to a portable manhole filter assembly adapted to be fitted over an open manhole so that dirt, dust, insects, rain, foreign particles and the like are not drawn into the interior of the tank, thus precluding contamination thereof, and so that the open manhole will not allow formation of vacuum within the tank or storage means.

It is an object therefore of the present invention to provide a portable manhole air filter assembly so that contamination is precluded and eliminated in open manholes of storage means and tanks that are used in the food and dairy industry.

A further object of the present invention is to provide a filter assembly portable in nature to fit over a manhole so that the operator can open a manhole cover to provide sufficient venting area to prevent vacuum from being created inside the tank or storage means.

Another object of the present invention is to provide a paper filter disk disposable in nature, through which air may flow in passing through the portable manhole filter assembly of the invention.

A further object of the present invention is to provide a paper filter disk through which air flows in and around the periphery of the dome-shaped shield and through the paper filter disk, through the paper filter disk support, and into the tank for eliminating creation of a vacuum.

A further object of the invention is to provide for the unloading of a product usable in the food and dairy industry in which only clean filtered air is admitted to the tank during discharge of the product, thus preventing contamination of the remaining product.

A further object of the present invention is to provide for use with a transport tank or tanker or other storage means, when it is ready for unloading, by placing a further assembly apparatus over the manhole opening to filter air that is fed to the tank.

A further object of the present invention is to provide a replaceable filter disk for use with portable manhole filter assemblies in accordance with the present invention.

The above and other objects and advantages of the invention will become apparent upon full consideration of the following detailed description and accompanying drawings, in which:

FIGURE 1 is a plan elevational view of the filter frame to be fitted over a manhole, in accordance with the present invention.

FIGURE 2 is a cross-sectional and partially broken away view of the portable manhole filter assembly in accordance with FIGURE 1, and FIGURE 3 is an exploded side elevation and cross-sectional view of the composite components of the portable manhole filter assembly, taken in part along line 2—2 of FIGURE 1.

Referring now to the drawings, there is shown a portable manhole filter assembly 10 having a filter frame 12 which is adapted to be mounted upon and over a manhole opening 14, shown in part in FIGURE 2, of a transport tank used in the food and dairy industry, and in which there is disposed a plurality of perforated holes 16, 16, in a central portion 18 of the filter frame, which is adapted to provide air flow therethrough.

A gasket 20 is shown in FIGURE 2 interposed between the filter frame 12 and the manhole opening 14 so that an air-tight relation is disposed between these two members and for sealing the opening to the filter frame.

There are disposed a series of spatially disposed upstanding lugs 22, 22, mounted about the periphery of the filter frame 12 so that there is a spatial relation between the filter frame 12 and a metal cover dome 26, having its edges generally coextensive in dimension peripherally about the filter frame 12. The cover dome has an equal numbered series of mounting holes 28 through which a threaded or shank portion of reduced diameter of the upstanding lug 22 passes, for mounting the cover dome 26 on the reduced portion 30 of the upstanding lugs 22. A wing nut is secured by threaded engagement onto the reduced portion 30 in a well-known manner so that the cover dome 26 is secured firmly onto the filter frame.

The central portion 18 of the filter frame may be raised a slight amount throughout the central portion, to prevent the collection of dirt and other foreign matter, and a filter disk of paper 34 is provided to cover said central portion of the filter frame 12.

There is dependingly or suspended from the underside of the cover dome 26, a series of extensions 36 from which is mounted a filter disk hold-down member 38 having a generally hollow central portion for the passage of air along the arrows 40, 40, as shown. The hollow edge portions of the filter disk hold-down member 38 come into contact with the peripheral portion of the central portion 18 of the filter frame, the raised portion being shown as element 46 in FIGURES 2 and 3. The peripheral or edge portion of the filter disk hold-down member is bent downwardly in a flange or lip element 50 so that it maintains the paper filter disk 34 in tight engagement with the central portion 18 of the filter frame.

On the central and top portion of the filter dome or cover dome 26, there is provided a handle 54 so that the entire portable manhole filter assembly 10 may be lifted and removed onto and from the opening 14 of the tank.

It is also seen that the lugs 22 are substantially and generally throughout in parallel relation with the rods 36.

It is seen that by the unloading of bulk material from pickup and transport tanks in the food and dairy industry by means of the portable manhole filter assembly of the present invention, vacuums are prevented from being caused and created in the tank which would otherwise be caused by dispensing of the bulk material without replacing it with air from the top. In this way the objects and advantages of the invention are satisfied, and it is seen that the paper filter disk 34 may be replaced by other and clean paper disks in the use of the invention.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A portable manhole filter assembly for an over-the-road transportation tank for use during unloading bulk pickup and transport tanks comprising a filter frame adapted to be mounted on a manhole opening in said tank and having a central portion perforated to provide air flow through it, a series of spatially disposed upstanding lugs mounted about the periphery of the filter frame, a cover dome coextensive in peripheral dimensions with the filter frame and having mounting holes to be supported from said upstanding lugs, wing nuts for holding the cover dome in place, a filter disk of paper covering said central portion of the filter frame, a filter disk hold-down means to engage the filter disk in place onto the filter frame and being suspendedly mounted from the underside of said cover dome by rods generally parallel to said upstanding lugs, said means having a central portion also being perforated, said central portion being raised and said filter disk hold-down means having mating edges therewith.

2. A sanitary portable manhole filter assembly according to claim 1 for transportation and bulk pickup tanks for use during unloading, including said filter frame mounted on a manhole opening in said tank to support said filter disc being held in place by a hold-down device, and shielded by a protective said cover dome, said filter disc being removable and disposable.

3. The invention according to claim 2 having filtering means admitting only filtered air to the tank during the unloading and thereby preventing the entrance of airborne contamination.

References Cited

UNITED STATES PATENTS

| | | | |
|---|---|---|---|
| 836,174 | 11/1906 | Bauer | 55—511 X |
| 2,092,925 | 9/1937 | Lithgow | 55—385 X |
| 2,695,196 | 11/1954 | Talmey et al. | 55—395 X |
| 2,708,142 | 5/1955 | Donovan | 55—511 X |
| 2,732,092 | 1/1956 | Lawrence | 55—502 X |
| 3,015,228 | 1/1962 | Shuttleworth et al. | 55—502 X |
| 3,169,844 | 2/1965 | Young | 55—502 X |
| 3,289,396 | 12/1966 | Anderson | 55—385 |

FOREIGN PATENTS 536,416    1/1957    Canada.

HARRY B. THORNTON, *Primary Examiner.*

S. W. SOKOLOFF, *Assistant Examiner.*